(12) United States Patent
Larock

(10) Patent No.: US 6,928,708 B1
(45) Date of Patent: Aug. 16, 2005

(54) HAND-HELD DEVICE FOR SELECTIVELY ATTACHING OR DETACHING A WATER DRIP SYSTEM CONNECTOR OR PLUG

(76) Inventor: Stephen G. Larock, 4356 Barnett Ranch Rd., Shingle Springs, CA (US) 95682

( * ) Notice: Subject to any disclaimer, the term of this patent is extended or adjusted under 35 U.S.C. 154(b) by 0 days.

(21) Appl. No.: 10/657,532

(22) Filed: Sep. 8, 2003

(51) Int. Cl.⁷ .............................................. B23P 19/04
(52) U.S. Cl. ...................................................... 29/237
(58) Field of Search ........................ 29/278, 280, 270, 29/272, 237

(56) References Cited

U.S. PATENT DOCUMENTS

| | | |
|---|---|---|
| 3,119,174 A | 1/1964 | Wokeck |
| 4,017,958 A | 4/1977 | Diggs |
| 4,226,457 A | 10/1980 | Shutt |
| 4,341,002 A | 7/1982 | Diba |
| 4,512,071 A | 4/1985 | Fieberg et al. |
| 4,522,339 A | 6/1985 | Costa |
| 4,561,159 A | 12/1985 | Schuster |
| 5,177,846 A | 1/1993 | Bryant |
| D357,162 S | 4/1995 | Chacon |
| 5,722,142 A | 3/1998 | Myers |
| 5,893,201 A | 4/1999 | Myers |
| 6,430,797 B1 * | 8/2002 | Dittmar et al. ............... 29/278 |

* cited by examiner

Primary Examiner—Robert C. Watson
(74) Attorney, Agent, or Firm—Thomas R. Lampe

(57) ABSTRACT

A hand-held device for selectively attaching a water drip system connector to a water drip system conduit or detaching the water drip system connector from the conduit. The device can be employed to connect different types of attachments such as plugs to conduits or disconnect the attachments therefrom.

7 Claims, 3 Drawing Sheets

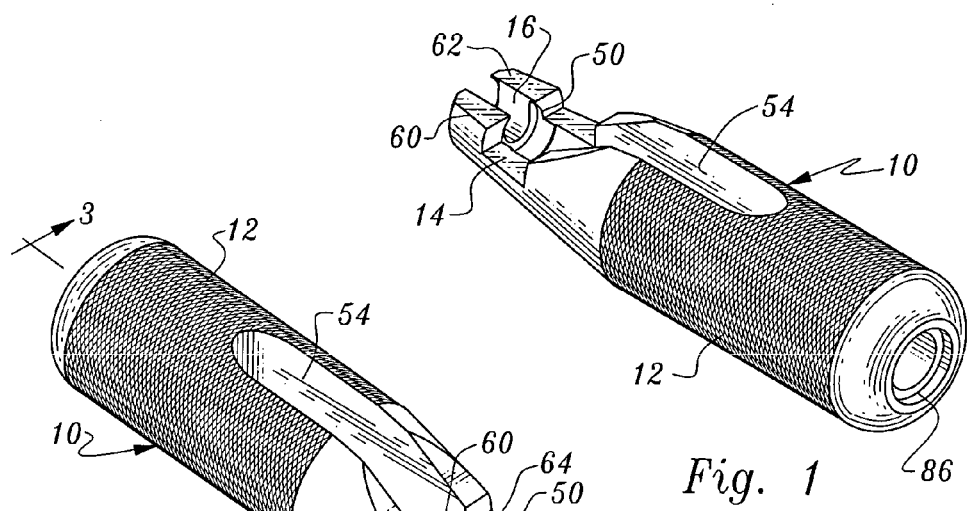
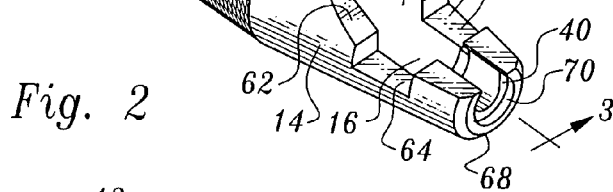
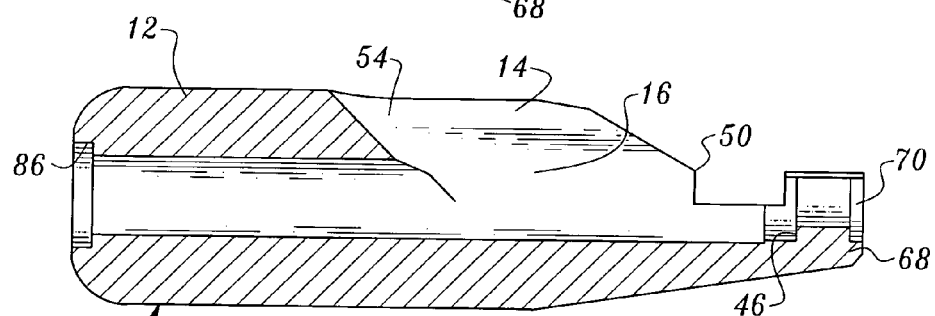
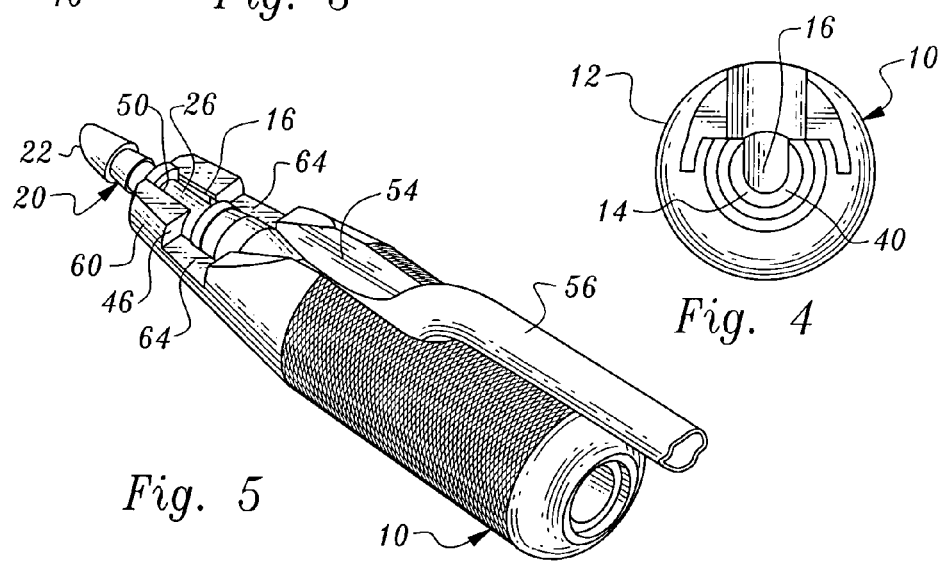
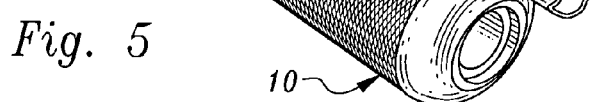

HAND-HELD DEVICE FOR SELECTIVELY ATTACHING OR DETACHING A WATER DRIP SYSTEM CONNECTOR OR PLUG

TECHNICAL FIELD

This invention relates to irrigation systems wherein a connector or fitting is utilized to interconnect a water drip system conduit and a line receiving water from the conduit, and more particularly to a device for installing or removing the connector. The device can also be employed to install plugs employed to plug holes in the conduit.

BACKGROUND OF THE INVENTION

Water drip systems are in widespread usage to deliver irrigation water to plants. Such systems employ a conduit and lines branching off from the conduit to receive water therefrom and direct the water to a plurality of locations.

It is well known to employ fittings or connectors to interconnect the conduit and the lines. Some of these connectors employ sharp ends which are used to pierce the conduit and establish a water flow interconnection between the conduit and the branch line associated with the connector.

Tools of various types have been devised to facilitate installation of a connector on a conduit the former and latter typically formed of plastic material. This may include piercing of the conduit by the connector or insertion of a connector in a preformed conduit hole. It is also known to attempt this procedure with non-specialized tools such as pliers or even by hand without the use of a tool.

Specialized tools for this purpose have a number of drawbacks. For example, such devices can be awkward or difficult to use. Furthermore, the connector or fitting is not always maintained in a stable condition by the tool when utilized, adding to the difficulty of the task. Some devices are characterized by their relative complexity. Another deficiency existing in the known prior art is the inability of installation tools to facilitate removal or detachment of a connector from a conduit as well as attachment of the fitting. Nor can conventional tools or devices can be employed to connect plugs employed with the conduit, limiting their utility.

The following United States patents are believed to be representative of the current state of the prior art in this field: U.S. Pat. No. 5,722,142, issued Mar. 3, 1998, U.S. Pat. No. 5,893,201, issued Apr. 13, 1999, U.S. Pat. No. 4,341,002, issued Jul. 27, 1982, U.S. Pat. No. 5,655,294, issued Aug. 12, 1997, U.S. Pat. No. 4,522,339, issued Jun. 11, 1985, U.S. Pat. No. 4,226,457, issued Oct. 7, 1980, U.S. Pat. No. 3,074,155, issued Jan. 22, 1963, U.S. Pat. No. 4,561,159, issued Dec. 31, 1985, U.S. Pat. No. 4,512,071, issued Apr. 23, 1985, U.S. Pat. No. 4,017,958, issued Apr. 19, 1977, U.S. Pat. No. DES. 357,162, issued Apr. 11, 1995, U.S. Pat. No. 5,177,846, issued Jan. 12, 1993 and U.S. Pat. No. 3,119,174, issued Jan. 28, 1964.

The devices shown in these patents do not teach or suggest the device disclosed and claimed herein.

DISCLOSURE OF INVENTION

The present invention relates to a hand-held device for selectively attaching a water drip system connector or fitting to a water drip system conduit or detaching the water drip system connector from the water drip system conduit. The device is for use with different types of conduit attachments, the principal one being a water drip system connector having two spaced connector ends, a connector shaft disposed between the connector ends and spaced first and second projections projecting outwardly from the connector shaft between the connector ends. The water drip system connector defines an elongated water flow passageway extending through the connector shaft and the connector ends.

The device of the invention is of unitary construction and includes a handle portion and a holder portion affixed to and extending from the handle portion.

The holder portion defines a holder portion cavity for releasably accommodating therein the water drip system connector. The holder portion includes a first abutment surface at a first holder portion cavity location for abutting against the water drip system connector first projection for attaching the water drip system connector to the water drip system conduit when the device and the water drip system conduit are moved relatively toward one another by an individual grasping the handle portion.

The holder portion includes a second abutment surface at a second holder portion cavity location for abutting against the water drip system connector second projection for detaching the water drip system connector from the water drip system conduit when the device and the water drip system conduit are moved relatively away from one another by an individual grasping the handle portion.

Other features, advantages and objects of the present invention will become apparent with reference to the following description and accompanying drawings.

BRIEF DESCRIPTION OF DRAWINGS

FIG. 1 is a rear, perspective view of a device constructed in accordance with the teachings of the present invention;

FIG. 2 is a front, perspective view thereof;

FIG. 3 is an enlarged, cross-sectional view taken along the line 3—3 in FIG. 2;

FIG. 4 is a front, elevational view of the device;

FIG. 5 is a view similar to FIG. 1, but illustrating a connector and associated line positioned in place in the device;

BEST MODE FOR CARRYING OUT THE INVENTION

Figure 6:
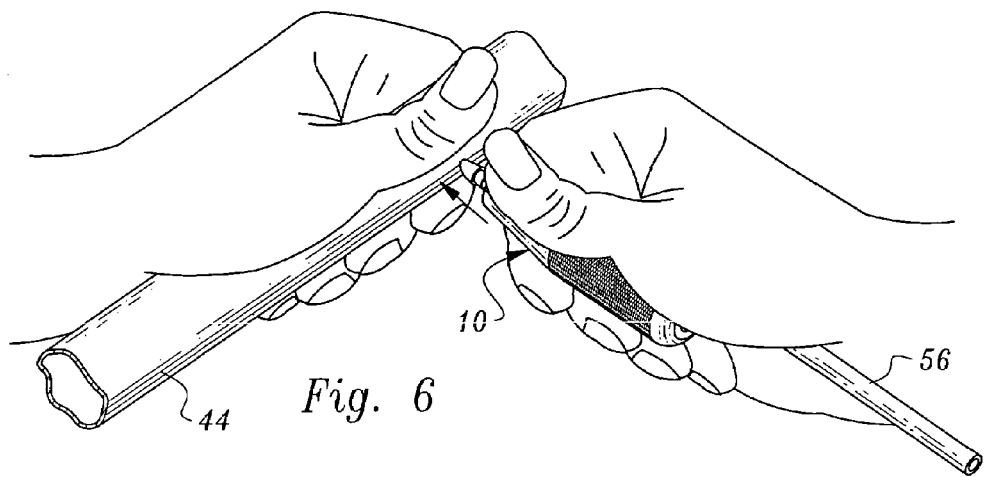
FIG. 6 illustrates the device being utilized to install the water drip system connector on a conduit.

Referring now to the drawings, a hand-held device constructed in accordance with the teachings of the present invention is designated by reference numeral 10. The device is of integral construction, preferably, but not necessarily, being of molded plastic construction.

Device 10 includes a handle portion 12 which may have a roughened outer peripheral surface as shown and a holder portion 14. Holder portion 14 is affixed to and extends from the handle portion.

The holder portion 14 defines a holder portion cavity 16 which is for releasably accommodating therein a water drip system connector of a well known type.

More specifically, the connector 20 has two spaced connector ends 22, 24 which are pointed. The connector also includes a connector shaft 26 disposed between the connector ends as well as annular projections 28, 30 which radially project outwardly from the connector shaft between the connector ends. The connector, as is conventional, defines an elongated water flow passageway extending through the connector shaft and the connector ends to provide flow of water from a conduit and a branch line interconnected by the connector.

Figure 7:
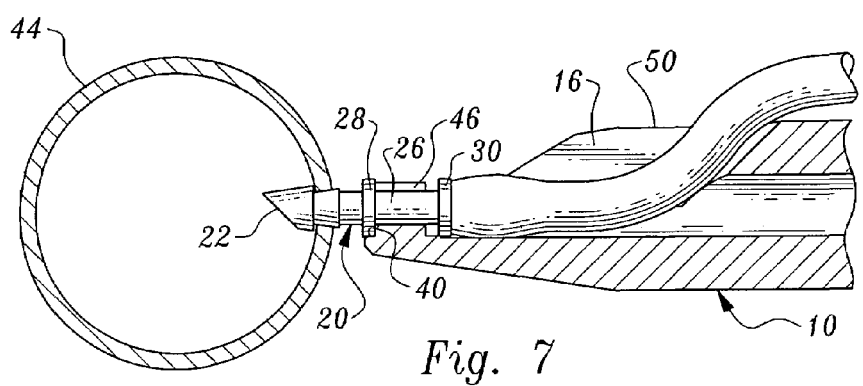
FIG. 7 is an enlarged cross-sectional view illustrating the tool employed to pierce the conduit with the sharpened end of the connector.
Figure 8:
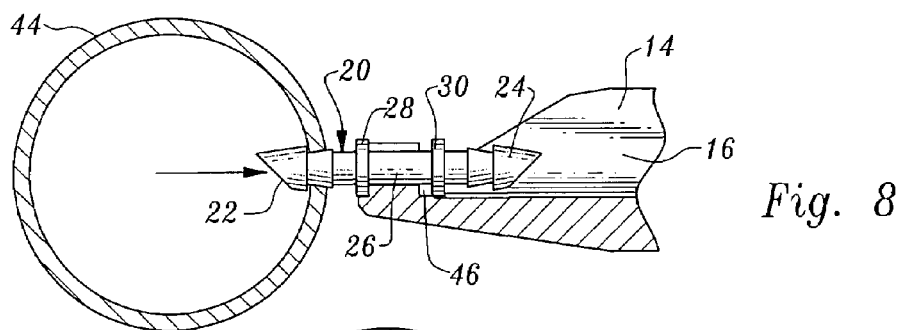
FIG. 8 illustrates the connector disconnected from its associated line and prior to removal of the connector by the device.

Holder portion 14 includes a first abutment surface 40 at a first holder portion cavity location for abutting against the connector projection 28 for attaching the connector to a water drip system conduit 44 when the device 10 and the conduit are moved relatively toward one another by an individual grasping the handle portion 12. This is shown in FIG. 6. The individual uses the tool to impart sufficient force to the connector to cause the connector to pierce the conduit and seat into position as shown in FIG. 7. The connector is pushed in until the projection 28 engages the conduit to fully seat the connector in position.

Figure 9:
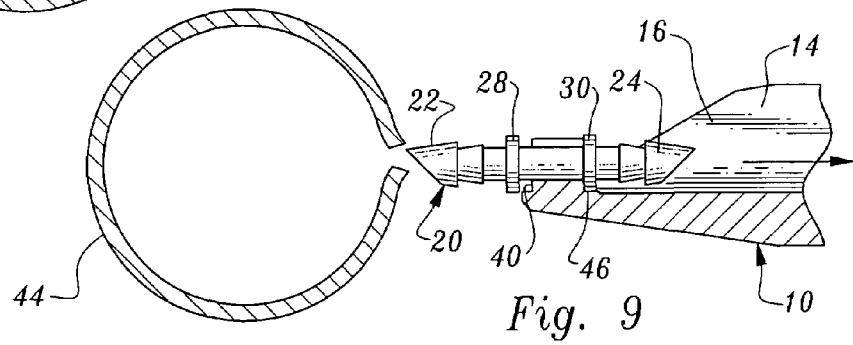
FIG. 9 illustrates the connector having been removed from the conduit.

The holder portion includes a second abutment surface 46 which is located at a second holder portion cavity location for abutting against the connector second projection 30 to detach the water drip system connector from the conduit when the device and the water drip system conduit are moved relatively away from one another by an individual grasping the handle portion. FIG. 9 illustrates removal of the connector from the conduit by the tool due to engagement between projection 30 and the second abutment surface 46.

Holder portion 14 defines a holder portion opening 50 which communicates with the cavity 16 and receives the thumb or other finger of the individual grasping the handle portion whereby the thumb or other finger can be placed in engagement with the water drip system connector to maintain it in the cavity 16 in a stable manner. This is shown in FIG. 6.

The handle portion 12 defines a handle portion cavity 54 in communication with the holder portion cavity 16 for accommodating a water drip system line 56 if such a line is pre-attached to the connector. This also adds to the stability of the arrangement during use since the user can hold down the line with the palm of his or her hand as a thumb or other finger is in engagement with the connector as described above. The handle portion cavity 54 extends from the outer peripheral wall of the handle portion to the holder portion cavity and becomes progressively deeper in the direction of the holder portion cavity.

The holder portion includes spaced holder portion side walls 60, 62 disposed on opposed sides of both the holder portion cavity 16 and the holder portion opening 50. The holder portion side walls have notches 64 forming holder portion side wall segments of reduced height. The holder portion has a distal holder portion end 68 spaced from the holder portion side wall segments at the notched-location. The notches provide for greater access by the user's thumb or other finger when holding the connector in position.

The second abutment surface 46 is on the holder portion side walls at the notches and the first abutment surface 40 is located on indent 70 formed by the distal holder portion end 68. To further increase stability between the connector and the holder portion, the side walls 60, 62 have curved inner surfaces corresponding to the curvature of projections 28, 30 and engaging the projections.

Figure 10:
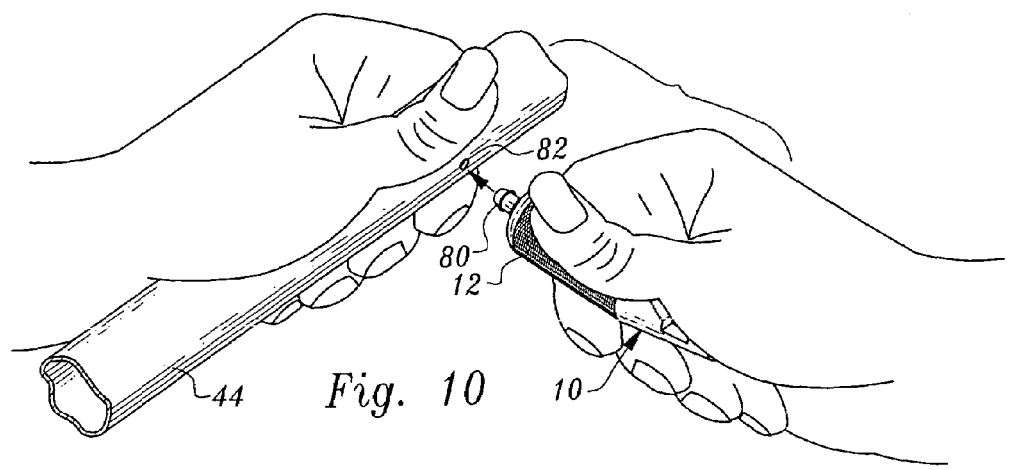
FIG. 10 illustrates the device holding another form or configuration of conduit attachment in the form of a plug and just prior to insertion of the plug into a hole formed in the conduit.
Figure 11:
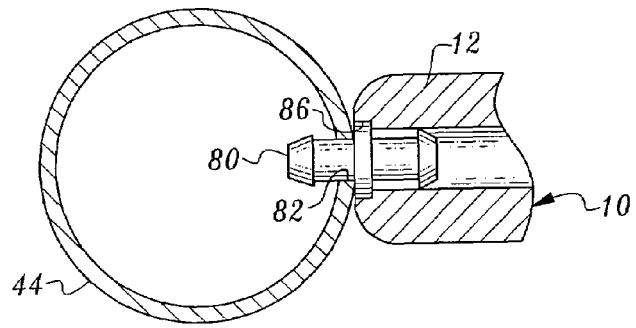
FIG. 11 is an enlarged cross-sectional view illustrating the plug shown in FIG. 10 installed in position on the conduit by the device.

Referring now to FIGS. 10 and 11, a different form of conduit attachment in current usage, plug 80, is illustrated. The plug has an outer configuration differing from that of connector 20. The device 10 can be utilized to connect water drip system plug 80 to conduit 44. The plug 80 is forced by the device 10 into a hole 82 already formed in the conduit. The plug 80 is positioned in a recess 86 located at the rear handle portion end of device 10, the handle portion cavity 16 of course being located at the front handle portion end. FIG. 10 shows the device just prior to insertion of the plug 80 into the conduit and FIG. 11 shows the plug 80 in position.

Figure 12:
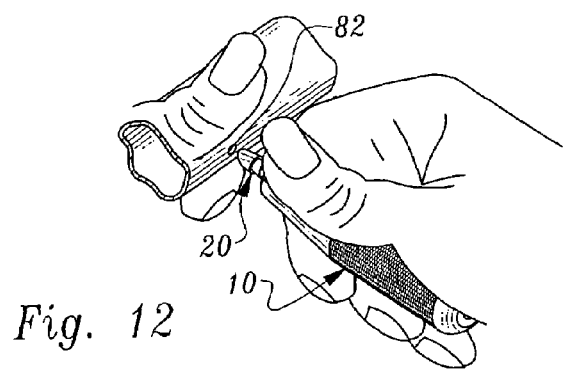
FIG. 12 is a view similar to FIG. 10, but illustrating the form of connector shown in FIGS. 5–9 being inserted into a preformed hole.
Figure 13:
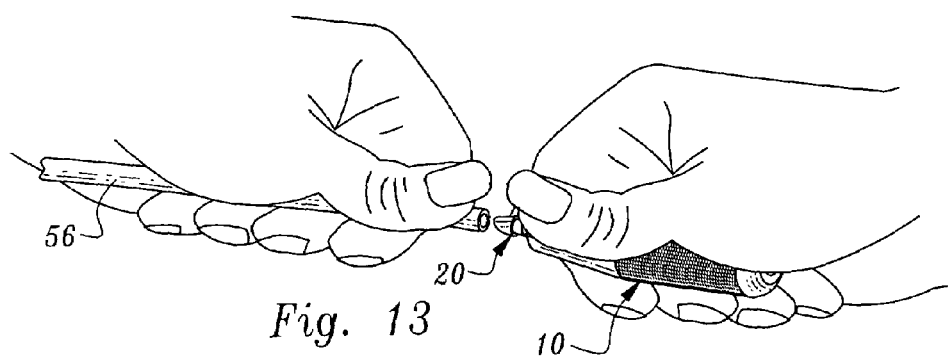
FIG. 13 illustrates use of the device to make a connection between the connector and a drip system branch line, the connector in the process of being inserted into an open end of the line.

FIG. 12 shows the device 10 being utilized to insert connector 20 into a preformed hole 82 in the conduit, and FIG. 13 shows the device 10 being utilized to insert the connector 20 into an end of a line 56.

The invention claimed is:

1. A hand-held device for selectively attaching a water drip system connector to a water drip system conduit or detaching the water drip system connector from the water drip system conduit, said water drip system connector having two spaced connector ends, a connector shaft disposed between said connector ends and spaced first and second projections projecting outwardly from said connector shaft between said connector ends, said water drip system connector defining an elongated water flow passageway extending through said connector shaft and said connector ends, said device being of unitary construction and comprising, in combination:

a handle portion; and a holder portion affixed to and extending from said handle portion, said holder portion defining a holder portion cavity for releasably accommodating therein said water drip system connector, said holder portion including a first abutment surface at a first holder portion cavity location for abutting against the water drip system connector first projection for attaching the water drip system connector to the water drip system conduit when the device and the water drip system conduit are moved relatively toward one another by an individual grasping the handle portion, and said holder portion including a second abutment surface at a second holder portion cavity location for abutting against the water drip system connector second projection for detaching the water drip system connector from the water drip system conduit when the device and the water drip system conduit are moved relatively away from one another by an individual grasping the handle portion, said holder portion further defining a holder portion opening communicating with said holder portion cavity for receiving the thumb or other finger of the individual grasping the handle portion whereby the thumb or other finger can be placed in engagement with the water drip system connector to maintain the water drip system connector in said holder portion cavity and a handle portion cavity in communication with said holder portion cavity for accommodating a water drip system line attached to said water drip system connector.

2. The device according to claim 1 of integral, molded plastic construction.

3. A hand-held device for selectively attaching a water drip system connector to a water drip system conduit or detaching the water drip system connector from the water drip system conduit, said water drip system connector having two spaced connector ends, a connector shaft disposed between said connector ends and spaced first and second projections projecting outwardly from said connector shaft between said connector ends, said water drip system connector defining an elongated water flow passageway extending through said connector shaft and said connector ends, said device being of unitary construction and comprising, in combination:

a handle portion; and a holder portion affixed to and extending from said handle portion, said holder portion defining a holder portion cavity for releasably accommodating therein said water drip system connector, said holder portion including a first abutment surface at a first holder portion cavity location for abutting against the water drip system connector first projection for attaching the water drip system connector to the water drip system conduit when the device and the water drip system conduit are moved relatively toward one another by an individual grasping the handle portion, and said holder portion including a second abutment surface at a second holder portion cavity location for abutting against the water drip system connector second projection for detaching the water drip system connector from the water drip system conduit when the device and the water drip system conduit are moved relatively away from one another by an individual grasping the handle portion, said holder portion further defining a holder portion opening communicating with said holder portion cavity for receiving the thumb or other finger of the individual grasping the handle portion whereby the thumb or other finger can be placed in engagement with the water drip system connector to maintain the water drip system connector in said holder portion cavity, said holder portion including spaced holder portion side walls disposed on opposed sides of both said holder portion cavity and said holder portion opening, said holder portion side walls having notches forming holder portion side wall segments of reduced height, said holder portion having a distal holder portion end spaced from said holder portion side wall segments, said second abutment surface being on said holder portion side walls at said notches and said first abutment surface being on said distal holder portion end.

4. The device according to claim 3 wherein said distal holder portion end forms an indent, said first abutment surface located on said indent.

5. The device according to claim 1 wherein said handle portion cavity extends from an outer peripheral wall of said handle portion to said holder portion cavity and becomes progressively deeper in the direction of said holder portion cavity.

6. The device according to claim 3 wherein said spaced holder portion side walls have curved inner surfaces.

7. A hand-held device for selectively attaching a water drip system connector to a water drip system conduit or detaching the water drip system connector from the water drip system conduit, said water drip system connector having two spaced connector ends, a connector shaft disposed between said connector ends and spaced first and second projections projecting outwardly from said connector shaft between said connector ends, said water drip system connector defining an elongated water flow passageway extending through said connector shaft and said connector ends, said device being of unitary construction and comprising, in combination:

a handle portion; and a holder portion affixed to and extending from said handle portion, said holder portion defining a holder portion cavity for releasably accommodating therein said water drip system connector, said holder portion including a first abutment surface at a first holder portion cavity location for abutting against the water drip system connector first projection for attaching the water drip system connector to the water drip system conduit when the device and the water drip system conduit are moved relatively toward one another by an individual grasping the handle portion, and said holder portion including a second abutment surface at a second holder portion cavity location for abutting against the water drip system connector second projection for detaching the water drip system connector from the water drip system conduit when the device and the water drip system conduit are moved relatively away from one another by an individual grasping the handle portion, said handle portion having a front handle portion end and a rear handle portion end, said front handle portion end adjoining and affixed to said holder portion and said rear handle portion end defining a recess for receiving and releasably holding a plug or other conduit attachment having a configuration differing from the water drip system connector accommodated by said holder portion cavity.

* * * * *